US012597608B2

(12) United States Patent (10) Patent No.: US 12,597,608 B2
Ceder et al. (45) Date of Patent: Apr. 7, 2026

(54) CATION-DISORDERED ROCKSALT TYPE HIGH ENTROPY CATHODE WITH REDUCED SHORT-RANGE ORDER FOR LI-ION BATTERIES

(71) Applicant: THE REGENTS OF THE UNIVERSITY OF CALIFORNIA, Oakland, CA (US)

(72) Inventors: Gerbrand Ceder, Orinda, CA (US); Zhengyan Lun, Albany, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 786 days.

(21) Appl. No.: 17/758,840

(22) PCT Filed: Feb. 3, 2021

(86) PCT No.: PCT/US2021/016357
§ 371 (c)(1),
(2) Date: Jul. 14, 2022

(87) PCT Pub. No.: WO2021/158620
PCT Pub. Date: Aug. 12, 2021

(65) Prior Publication Data
US 2023/0047457 A1 Feb. 16, 2023

Related U.S. Application Data

(60) Provisional application No. 62/971,598, filed on Feb. 7, 2020.

(51) Int. Cl.
*H01M 4/58* (2010.01)
*C01G 33/00* (2006.01)
(Continued)

(52) U.S. Cl.
CPC .......... *H01M 4/582* (2013.01); *C01G 33/006* (2013.01); *C01G 51/82* (2025.01); (Continued)

(58) Field of Classification Search
CPC ........... H01M 4/582; H01M 2004/028; H01M 4/1315; H01M 4/485; H01M 4/505; (Continued)

(56) References Cited

U.S. PATENT DOCUMENTS

2011/0168944 A1* 7/2011 Chang .................... H01M 4/525
252/182.1
2019/0088945 A1 3/2019 Ceder et al.
(Continued)

FOREIGN PATENT DOCUMENTS

CN 102169982 A 8/2011
CN 109305700 A * 2/2019 ............. C01G 53/82
(Continued)

OTHER PUBLICATIONS

Kitchaev et al., Design principles for high transition metal capacity in disordered rocksalt Li-ion cathodes, 2018, Energy Environ. Sci., 11. 2159 (Year: 2018).*
(Continued)

*Primary Examiner* — Daniel S Gatewood
(74) *Attorney, Agent, or Firm* — Smith, Gambrell & Russell, LLP

(57) ABSTRACT

A class of compositions that are inclusive of a lithium metal oxide or oxyfluoride compound having a general formula: LiTM[n]OF where TM[n] represents a number of transition metal species inclusive of transitional metal species differentiated by charge or $d^0$ electron shell conformation, with [n] being at least 4 of said transitional metal species, and wherein said lithium metal oxide or oxyfluoride has a cation-disordered rocksalt (DRX) structure and a mitigated
(Continued)

SRO via a high entropy DRX design strategy. Also featured is a method of synthesizing the high entropy DRX lithium metal oxide or oxyfluoride compounds, as well as usage of the same in Li-ion batteries, with particular utility in cathodes of such Li-ion batteries.

24 Claims, 12 Drawing Sheets

(51) Int. Cl.
        *C01G 51/82*          (2025.01)
        *H01M 4/02*          (2006.01)
(52) U.S. Cl.
        CPC ...... *C01P 2002/01* (2013.01); *C01P 2002/50*
              (2013.01); *C01P 2002/72* (2013.01); *C01P*
              *2002/77* (2013.01); *C01P 2002/78* (2013.01);
                    *C01P 2002/85* (2013.01); *C01P 2002/86*
              (2013.01); *C01P 2004/03* (2013.01); *C01P*
              *2006/40* (2013.01); *H01M 2004/028* (2013.01)
(58) Field of Classification Search
        CPC ........... H01M 10/052; H01M 2220/30; H01M
                    4/131; H01M 10/0525; C01G 33/006;
                    C01G 51/82; C01G 45/22; C01G 37/006;
                          C01G 39/006; C01G 23/002; C01G
                    45/1214; C01P 2002/01; C01P 2002/50;
                          C01P 2002/72; C01P 2002/77; C01P
                    2002/78; C01P 2002/85; C01P 2002/86;
                          C01P 2004/03; C01P 2006/40; C01P
                                      2002/30; Y02E 60/10
        See application file for complete search history.

(56)                    References Cited

U.S. PATENT DOCUMENTS

| | | | |
|---|---|---|---|
| 2020/0020943 | A1 | 1/2020 | Natsui et al. |
| 2020/0044249 | A1 | 2/2020 | Natsui et al. |
| 2020/0083529 | A1 | 3/2020 | Natsui et al. |
| 2020/0194790 | A1* | 6/2020 | Ceder .................... C01G 53/42 |

FOREIGN PATENT DOCUMENTS

| | | | | |
|---|---|---|---|---|
| CN | 110476277 | A | 11/2019 | |
| CN | 110600703 | A | 12/2019 | |
| KR | 10-2019-0082130 | A | 7/2019 | |
| WO | 2017/002467 | A1 | 1/2017 | |
| WO | 2018/163519 | A1 | 9/2018 | |
| WO | WO-2018187531 | A1 * | 10/2018 | ............. C01G 53/42 |
| WO | 2018/198410 | A1 | 11/2018 | |
| WO | 2018/220882 | A1 | 12/2018 | |
| WO | 2020/026971 | A1 | 2/2020 | |

OTHER PUBLICATIONS

Office Action mailed Jul. 21, 2023, for Canadian Patent Application No. 3,163,695 (4 pages).

International Preliminary Report on Patentability dated Jul. 28, 2022, for International Patent Application No. PCT/US2021/016357 (8 pages).

Office Action mailed Dec. 12, 2024 in Japanese Patent Application No. 2022-546061 (3 pages in Japanese; 4 pages English translation).

Decision of Rejection mailed May 11, 2024, for Chinese Patent Application No. 202180010546.3 (6 pages Chinese; 11 pages English).

Xiong Li et. al. The Theory and Model of Cooperative Commerce. "Collaborative Business Theory and Models". Published by Shanghai Academy of Social Sciences. Jun. 2006 (3 pages Chinese; 2 pages English).

Written Opinion of the International Searching Authority mailed May 31, 2021 for International Patent Application No. PCT/US2021/016357 (7 pages).

International Search Report mailed May 31, 2021 for International Patent Application No. PCT/US2021/016357 (4 pages).

Lee, J. et al. Reversible $Mn^{2+}/Mn^{4+}$ double redox in lithium-excess cathode materials. Nature. 2018. vol. 556, No. 7700. 22 Pages.

Kitchaev, D. et al. Design principles for high transition metal capacity in disordered rocksalt Li-ion cathodes. Energy & Environmental Science. 2018. vol. 11, No. 8, pp. 2159-2171.

Lee, J. et al. A new class of high capacity cation-disordered oxides for rechargeable lithium batteries: Li—Ni—Ti—Mo oxides. Energy & Science. 2015. vol. 8, No. 11, pp. 3255-3265.

Chang, J.H., et al. Clease: A versatile and user-friendly implementation of Cluster Expansion method, arXiv.org, Cornell University Library, 201 Olin Library Cornell University Ithaca, NY 14853, Oct. 30, 2018, XP0800933240, 14 Pages.

Kang, B. et al. Battery materals for ultrafast charging and discharging. Nature. 2009, vol. 458, pp. 190-193.

Barpanda, P. et al. A 3.90 V iron-based fluorosulphate material for lithium-ion batteries crystallizing in the triplite structure. Nature Materials. 2011. vol. 10, pp. 772-779.

Kang, K. et al. Electrodes with high power and high capacity for rechargeable lithium batteries. 2006. Science. vol. 311, pp. 977-980.

Lee, J. et al. Unlocking the potential of cation-disordered oxides for rechargeable lithium batteries. Science. 2014. vol. 343, pp. 519-522.

Urban, A. et al. The configurational space of rocksalt-type oxides for high-capacity lithium battery electrodes. Advanced Energy Materials. 2014. vol. 4, No. 1400478, 9 Pages.

Ji, H. et al., et al. Hidden structural and chemical order controls lithium transport in cation-disordered oxides for rechargeable batteries. Nature Communications. 2019. vol. 10, No. 592, pp. 1-9.

De Ridder, R. et al. A cluster model for the transition from the short-range order to the long-range order state in F.c.c. based binary systems and its study by means of electron diffraction. Acta Crystallographica, 1976. vol. A 32, Part 2, pp. 216-224.

Banerjee, S. et al. Order-disordered transformation in $Ni_4Mo$ under electron irradiation in a high-voltage electron microscope Acta. Metallurgica. 1984. vol. 32, No. 3, pp. 299-311.

Notice of Final Rejection mailed Sep. 9, 2024 for Korean Patent Application No. 10-2022-7028536 (5 pages Korean; 4 pages English translation).

Office Action mailed Aug. 13, 2024 in Canadian Patent Application No. 3,163,695 (5 pages).

Second Office Action mailed Mar. 1, 2024, for Chinese Patent Application No. 202180010546.3 (5 pages in Chinese; 6 pages English translation).

Office Action mailed Jan. 22, 2024, for Korean Patent Application No. 10-2022-7028536 (7 pages in Korean; 7 pages English translation).

Chinese Office Action mailed Jun. 7, 2023 for Chinese Patent Application No. 202180010546.3 (4 pages in Chinese; 4 pages English translation).

Notice of Reasons for Refusal mailed May 15, 2025 in Japanese Patent Application No. 2022-546061 (3 pages Japanese; 3 pages English).

* cited by examiner

Prototype composition design

| Li-excess | Redox center | $d^0$ charge compensator | Fluorination |

TM2  $Li_{1.3}$     $Mn(III)_{0.4}$     $Ti_{0.3}$     $O_{1.7}$ $F_{0.3}$

TM4  $Li_{1.3}$  $Mn(II)_{0.2}$  $Mn(III)_{0.2}$  $Ti_{0.1}$ $Nb_{0.2}$  $O_{1.7}$ $F_{0.3}$

TM6  $Li_{1.3}$  $Mn(II)_{0.1}Co(II)_{0.1}$  $Cr(III)_{0.1}Mn(III)_{0.1}$  $Ti_{0.1}$ $Nb_{0.2}$  $O_{1.7}$ $F_{0.3}$

CATION-DISORDERED ROCKSALT TYPE HIGH ENTROPY CATHODE WITH REDUCED SHORT-RANGE ORDER FOR LI-ION BATTERIES

FIELD OF THE INVENTION

The present invention relates to the design and synthesis of high entropy cation-disordered rocksalt (DRX) cathodes with a strategic increase in the number of transition metal (TM) species directed at providing a reduced short-range order (SRO) cathode. The increased number of TM species mitigates SRO and yields improvements in the capacity and rate capability of the DRX cathodes. The invention confirms, via testing, high-entropy as a novel avenue for the design of high capacity and high rate performance Li-ion cathodes.

BACKGROUND OF THE INVENTION

The increasing demand for cheap, portable, high density energy storage for personal devices, transportation, and in the electrical grid has driven the development of advanced Li-ion battery systems [1-3]. State-of the art high energy density battery systems are currently based on layered oxides targeting high voltage redox activity on Co, Mn, and Ni.

Recent work has identified disordered rocksalt (DRX) systems as potential high-capacity cathodes, as DRX systems offer a flexibility in composition and redox behavior, while avoiding reductions in rate capability if at least 55% of the cation sublattice is occupied by Li [4-5]. Li transport in the DRX materials has been shown to rely mainly on the 0-TM networks (percolation network), where the tetrahedral sites in the Li migration path are coordinated by zero transition metal. The Li connected to the percolation network is referred to as "percolating Li". The amount of percolating Li is an important indicator of the overall Li transport properties in DRX materials. In these DRX cathode materials, though lacking in long-range order (LRO), the presence of local cation short-range order (SRO) has been confirmed using transmission electron microscope (TEM) electron diffraction techniques, and their presence can significantly influence the capacity and rate capability of DRX materials [6]. To date, SRO is viewed in most cases as reducing the amount of percolating Li in the DRX materials, as shown by a previous Monte Carlo study [6].

It follows that a challenge exists to reduce the cation SRO so that capacity and rate performance of DRX cathodes can be improved.

SUMMARY OF THE INVENTION

The invention establishes that improvements in capacity and rate performance of DRX materials are possible when SRO is reduced. The approach in achieving this involves the use of "high entropy" mixtures to synthesize the DRX materials—a high entropy DRX design strategy. The strategy involves the use of a relatively large number of components, which limits the ability of the cations to form a specific short-range order. This has the effect of reducing short-range order, which makes the system more like a random mixture of the ions on the cation sublattice. This improves Li percolation in contrast to a DRX cathode with non-mitigated SRO.

Aspects of the invention are exemplified by points 1 to 31 below:

1. A lithium metal oxide or oxyfluoride compound having a general formula: $Li_{1+x}TM[n]_{1-x}O_{2-y}F_y$, wherein TM[n] includes transitional metal species inclusive of those differentiated by redox-active species or $d^0$ redox-inactive charge compensators, with [n] being at least four of said transition metal species, and wherein said lithium metal oxide or oxyfluoride has a cation-disordered rocksalt (DRX) structure.

2. The compound of illustrative point 1 wherein TM[n] includes at least $Mn^{3+}$ and $Ti^{4+}$.

3. The compound of illustrative point 1, wherein [n] is at least six of said transition metal species.

4. The compound of illustrative point 1, wherein [n] is from four to ten of said transition metal species.

5. The compound of illustrative point 1, wherein the at least four of said transition metal species are selected from the group of $Mn^+$, $Ti^{4+}$, $Mn^{2+}$, $Nb^{5+}$, $Co^{2+}$, and $Cr^{3+}$.

6. The compound of illustrative point 1, wherein the compound is $Li_{1.3}Mn^{2+}_{0.2}Mn^{3+}_{0.2}Ti_{0.1}Nb_{0.2}O_{1.7}F_{0.3}$.

7. The compound of illustrative point 1, wherein the compound is $Li_{1.3}Mn^{2+}_{0.1}Co^{2+}_{0.1}Cr^{3+}_{0.1}Mn^{3+}_{0.1}Ti_{0.1}Nb_{0.2}O_{1.7}F_{0.3}$.

8. The compound of illustrative point 5, which delivers a high capacity of 307 mAh/g at a cycling rate of 20 mA/g.

9. The compound of illustrative point 5, which retains a high capacity of 170 mAh/g at a cycling rate of 2 A/g.

10. The compound of illustrative point 1 wherein the cation ion order reflects a mitigated short range order (SRO) characterized by the fact that, in TEM electron diffraction patterns, the SRO diffuse scattering pattern intensity is equal to or less than around 0.31 a.u. larger than the background intensity, and preferably equal to or less than around 0.19 a.u. larger than the background intensity.

11. The compound of illustrative point 1 having the formula:

$Li_{1+x}TM[1]_aTM[2]_bTM[3]_cTM[4]_{d=(1-x-a-b-c)}O_{2-y}F_y$, wherein $0.05 \leq x \leq 0.35, 0.1 \leq a \leq 0.4, 0.1 \leq b \leq 0.4, 0.1 \leq c \leq 0.4, 0.1 \leq d \leq 0.4$, and $0 \leq y \leq 0.7$; or, more preferably, $0.1 \leq x \leq 0.3, 0.1 \leq a \leq 0.3, 0.1 \leq b \leq 0.3, 0.1 \leq c \leq 0.3, 0.1 \leq d \leq 0.3$, and $0 \leq y \leq 0.5$.

12. An electrode material, comprising:
   a. a compound according to any one of illustrative points 1-11.

13. A lithium-ion battery, comprising:
   a. an electrolyte; and
   b. the electrode material of illustrative point 12.

14. The lithium-ion battery of illustrative point 13, wherein the electrode material forms a cathode.

15. A portable electronic device, an automobile, or an energy storage system, comprising:
   a. the lithium-ion battery of illustrative point 14.

16. A method of making a lithium metal oxide or oxyfluoride compound having a general formula: $Li_{1+x}TM[n]_{1-x}O_{2-y}F_y$, where TM[n] can be inclusive of transitional metal species differentiated by redox-active species or $d^0$ redox-inactive charge compensators, and [n] is at least four of said transition metal species, comprising:
   a. combining a collection of stoichiometric or essentially stoichiometric compounds composed of Li, TM[n], O, and optionally F, with Li present in excess, to yield a precursor powder; and
   b. mixing the precursor powder to obtain the phase pure powder, with mixing being preferably through mechanochemical alloying.

17. The method according to illustrative point 16, wherein the TM[n] species are selected from $Mn^{3+}$, $Ti^{4+}$, $Mn^{2+}$, $Nb^{5+}$, $Co^{2+}$, and $Cr^{3+}$.

18. The method according to illustrative point 16, wherein
   a. the precursor powder is subjected to mechanical mixing by dispensing the precursor powder into a planetary ball mill.

19. The method of illustrative point 16, wherein the compound is inclusive of $Mn^{3+}$ and $Ti^{4+}$.

20. The method of illustrative point 19, wherein TM[n] further includes at least two of $Mn^{2+}$, $Nb^{5+}$, $Co^{2+}$, and $Cr^{3+}$.

21. The method of illustrative point 16, wherein the compound is $Li_{1.3}Mn^{2+}_{0.2}Mn^{3+}_{0.2}Ti_{0.1}Nb_{0.2}O_{1.7}F_{0.3}$.

22. The method of illustrative point 16, wherein, wherein the compound is $Li_{1.3}Mn^{2+}_{0.1}Co^{2+}_{0.1}Cr^{3+}_{0.1}Mn^{3+}_{0.1}Ti_{0.1}Nb_{0.2}O_{1.7}F_{0.3}$.

23. The method of illustrative point 16, wherein the compound has the formula:

$$Li_{1+x}TM[1]_aTM[2]_bTM[3]_cTM[4]_{d=(1-x-a-b-c)}O_{2-y}F_y,$$ wherein $0.05 \le x \le 0.3, 0.1 \le a \le 0.3, 0.1 \le b \le 0.3,$ $0.1 \le c \le 0.3, 0.1 \le d \le 0.3$, and $0 \le y \le 0.5$.

24. The method of illustrative point 23, wherein the compound is $Li_{1.3}Mn^{2+}0.2Mn^{3+}_{0.2}Ti_{0.1}Nb_{0.2}O_{1.7}F_{0.3}$.

25. The method of illustrative point 23, wherein the compound is $Li_{1.3}Mn^{2+}_{0.1}Co^{2+}_{0.1}Cr^{3+}_{0.1}Mn^{3+}_{0.1}Ti_{0.1}Nb_{0.2}O_{1.7}F_{0.3}$.

26. A lithium metal oxide or oxyfluoride compound having a general formula: $Li_{1+x}TM[n]_{1-x}O_{2-y}F_y$, wherein the compound is a cation-disordered rocksalt (DRX) structure and TM[n] designates a number of various transitional metal species comprising at least $Mn^{3+}$ and $Ti^{4+}$.

27. The compound according to illustrative point 26, further comprising at least two additional transitional metal species differentiated by redox-active species or $d^0$ redox-inactive charge compensators, and selected from the group consisting of $Mn^{2+}$, $Co^{2+}$, $Cr^{3+}$, and Nb.

28. The compound according to illustrative point 26, wherein the compound is $Li_{1.3}Mn^{2+}_{0.2}Mn^{3+}_{0.2}Ti_{0.1}Nb_{0.2}O_{1.7}F_{0.3}$.

29. The compound according to illustrative point 26, wherein the compound is $Li_{1.3}Mn^{2+}_{0.1}Co^{2+}_{0.1}Cr^{3+}_{0.1}Mn^{3+}_{0.1}Ti_{0.1}Nb_{0.2}O_{1.7}F_{0.3}$.

30. The compound of illustrative point 26 wherein the cation ion order reflects a mitigated short range order (SRO) characterized by the fact that, in TEM electron diffraction patterns, the SRO diffuse scattering pattern intensity is equal to or less than around 1.07 a.u. larger than the background intensity, preferably equal to or less than around 0.31 a.u. larger than the background intensity, and more preferably equal to or less than around 0.19 a.u. larger than the background intensity.

31. The compound according to any one of illustrative points 1-11 and 26-30, wherein the compound exhibits an enhanced charging capacity based on an overall entropy corresponding to the number of transitional metal species TM[n] included therein, independent of any specific transitional metal specie included therein.

It is also intended that all available illustrative combinations of the above listed points 1 to 31 are included within the present invention (as in the representative examples provided by point 12 referencing back to each of points 1-11, and point 31 referencing back to points 1-11 and 26-30).

Thus, under embodiments of the present invention are represented by the general formula $Li_{1+x}TM[n]_{1-x}O_{2-y}F_y$, where TM[n] includes various transition metal species having various charges or $d^0$ electron shell conformations. The $Li_{1+x}TM[n]_{1-x}O_{2-y}F_y$ compositions featured under the present invention include the following: an excess of lithium, a redox center, a $d^0$ charge compensator and, optionally, a fluorination agent. The particular transmission metal (TM) species, as well as the number thereof, are strategically chosen for use either as the redox center TM or the $d^0$ charge compensator TM, with the number of TM species being sufficient to implement a high entropy DRX design strategy that reduces SRO.

The present invention is thus inclusive of lithium metal oxides having a general formula: $Li_{1+x}TM[n]_{1-x}O_{2-y}F_y$, said lithium metal oxide having a cation-disordered rocksalt structure, wherein $0.05 \le x \le 0.3$ and $0 \le y \le 0.5$, and with TM[n] designating a number of transition metal species (inclusive of those differentiated by redox-active species or $d^0$ redox-inactive charge compensators). In one embodiment, the general formula may include $0.09 \le x \le 0.3$ and $0.10 \le y \le 0.35$. In another embodiment, [n] is four or more TMs, with the four or more TMs preferably selected from the group consisting of Ti, V, Cr, Mn, Fe, Co, Ni, Zr, Nb, Mo, Sn, and Sb. For example, TM may be selected from the more preferable group consisting of Mn, Nb, Ti, Cr, and Co. In still another embodiment, the value of [n] is 6 or more, with higher values representing higher entropy characteristics, and with the upper limit being potentially capped by processing and added complexity synthesis limitations. Thus, some non-limiting examples of suitable compositions that are designed for higher entropy, with SRO formation mitigation, include: $Li_{1.3}Mn^{2+}_{0.2}Mn^{3+}_{0.2}Ti_{0.1}Nb_{0.2}O_{1.7}F_{0.3}$, as well as $Li_{1.3}Mn^{2+}_{0.1}Co^{2+}_{0.1}Cr^{3+}_{0.1}Mn^{3+}_{0.1}Ti_{0.1}Nb_{0.2}O_{1.7}F_{0.3}$.

To facilitate an understanding as to how a high entropy DRX design strategy reduces SRO, some discussion of species distribution is provided. That is, a random mixture is one where the species distributed over a set of sites is randomly assigned to a given site without any consideration of the occupation of the neighboring sites. As an example, in a random mixture of A and B cations with mole fraction $x_A$ and $x_A$, the probability that a site is occupied by A is $P_A = x_A$. Similarly, the probability that the site is occupied by B is $P_B = x_B$. Because the occupations of each site are uncorrelated, the probability that a specific nearest neighbor is of type AA is equal to $P_{AA} = P_A * P_A = x^2_A$. Similar expressions exist for $P_{BB}$ and $P_{AB}$.

In a mixture with SRO the probability that a site is occupied by a certain species is determined in part by the occupancy of the neighboring site. As a result, $P_{AB} \neq P_A * P_B$, because the fact that A is present on the first site influences the probability that B is present on the neighbor site. Such SRO correlations are not limited to the nearest neighbor bonds but can extend to a longer distance. These deviations from randomness are called short-range order or "SRO" and can be measured by a variety of techniques, including single-crystal X-ray scattering and electron diffraction in TEM. [7-8]. SRO can also be inferred from a variety of other techniques including pair distribution functions obtained from neutron diffraction [6]. The high entropy DRX design strategy of the present invention is directed at mitigating SRO formation, with the resultant mitigation being verifiable by testing under the present invention, to yield improvements in capacity and rate performance, which may also be verified by testing carried out under the present invention.

To illustrate advantages of the present invention's high entropy DRX design strategy, there was formed three prototype compositions TM2, TM4, and TM6. These compositions differ in the transitional metal species present. Li, O, and F are kept constant in these three compositions, with Li present in excess in each. Six additional compounds with the same prototype composition were also designed to confirm it is the overall entropic effect that leads to the improvement in capacity.

All of the prototype compositions (TM2, TM4, and TM6) designed for testing featured 30% Li-excess (i.e., $Li_{1.3}$ per formula unit) as an amount sufficient to enable good Li transport, while on the other hand, avoiding too much limitation on TM redox capacity. In the prototype compositions designed for testing there was 15% fluorine substitution to further increase the TM redox reservoir. The combination of $Mn^{3+}$ and $Ti^{4+}$ was designed as a baseline composition (e.g., in addition to being a high functioning baseline combination under the present invention, it is also helpful in showing higher entropy improvements under the present invention testing). Thus, with the baseline combination alone there is provided the compound formula $Li_{1.3}Mn^{3+}_{0.4}Ti_{0.3}O_{1.7}F_{0.3}$, referred to hereafter as TM2. Under the present invention, the TMs $Mn^{2+}$ and $Nb^{5+}$ were further incorporated into the baseline composition to form $Li_{1.3}Mn^{2+}_{0.2}Mn^{3+}_{0.2}T_{0.1}Nb_{0.2}O_{1.7}F_{0.3}$, which contain four TM species, referred to hereafter as TM4. In another example there was added the TMs $Mn^{2+}$, $Nb^{5+}$, $Co^{2+}$, and $Cr^{3+}$ to form $Li_{1.3}Mn^{2+}_{0.1}Co^{2+}_{0.1}Cr^{3+}_{0.1}Mn^{3+}_{0.1}Ti_{0.1}Nb_{0.2}O_{1.7}F_{0.3}$, which contains six TM species, referred to hereafter as TM6.

All three prototype compositions were successfully synthesized using traditional solid-state methods. Scanning electron microscopy (SEM) shows that the particle size of the as-synthesized material reaches around 5-10 μm and can be reduced to 200-500 nm after shakermill with carbon during electrode fabrication. Synchrotron X-ray diffraction (XRD) patterns and time-of-flight (TOF) neutron diffraction patterns confirm the formation of pure DRX structures with no observable impurity peaks. Rietveld refinement yield lattice constants of 4.1918 Å, 4.2286 Å and 4.2544 Å for TM2, TM4, and TM6, respectively. Energy-dispersive spectroscopy (EDS) mapping using a transmission electron microscope (TEM) was applied to confirm the uniform distribution of multi-elements in the materials.

The compounds of the invention are suited for use in the preparation of electrodes, especially, cathodes. The compounds have an increased number of TM species (e.g., TM[n], where [n] is four or more (e.g., 4-10) and, more preferably in some environments, six or more (e.g., 6-10)). The increased number of TMs mitigates SRO, which is shown under the present invention to improve the capacity and rate capability of resultant DRX cathodes. The species can differ in terms of charge and/or d-shell conformation. The DRX cathodes are characterized by improved performance as can be seen in that, when cycled between 1.5 and 4.7 V at a rate of 20 mA $g^{-1}$, the TM2 prototype delivers a relatively high capacity (specific energy) of 220 mAh $g^{-1}$ (704 Wh $kg^{-1}$), whereas the TM4 prototype, with a greater number of TM species demonstrates an even a higher capacity of 269 mAh $g^{-1}$ (849 Wh $kg^{-1}$), while the TM6 prototype, with a yet greater number of TM species, further increases to 307 mAh $g^{-1}$ (955 Wh kg). The high entropy TM6 compound can continue to deliver a relatively high discharge capacity of 246 mAh $g^{-1}$ (803 Wh $kg^{-1}$), even when cycled at a smaller voltage window of 2.0-4.5V at a rate of 20 mA $g^{-1}$. Six additional compounds with the same prototype composition are also presented to demonstrate the role of the overall entropic effect (rather than any specific transition metal ion), which leads to the enhancement in capacity. The performance of these compounds confirms high-entropy as a novel avenue of design for high capacity and high rate performance Li-ion cathodes. Lithium-ion batteries that employ these cathodes also evidence improved performance, and thus portable electronic devices, vehicles (such as spacecraft and automobiles), and energy storage systems that employ such a battery will likewise evidence improved performance.

Still further, compounds under the present invention may be readily synthesized using conventional techniques by combining a strategic number (and combination) ("collection") of stoichiometric compounds composed of, for example, Li, Mn, Ti, Nb, O, and F to yield a precursor powder which is then preferably mechanically mixed to obtain the phase pure powder through mechanochemical alloying. Li is advantageously present in excess. Further improvements are introduced by including in the precursor powder a combination of Mn, Ti, Nb, Co, and Cr. The ball mill used is preferably a planetary ball mill.

Both the foregoing general description and the following detailed description are exemplary and explanatory only and are intended to provide further explanation of the invention as claimed. The accompanying drawings are included to provide a further understanding of the invention; are incorporated in and constitute part of this specification; illustrate embodiments of the invention; and, together with the description, serve to explain the principles of the invention.

BRIEF DESCRIPTION OF THE DRAWINGS

Further features and advantages of the invention can be ascertained from the following detailed description that is provided in connection with the drawings described herebelow.

FIG. 2a shows a prototype composition design of DRX cathodes with the different numbers of TMs in the respective compositions. FIG. 2b shows synchrotron XRD patterns and refined lattice constants of the synthesized prototype compositions at λ=0.18208 Å. FIG. 2c shows neutron diffraction patterns of the synthesized prototype compositions. FIG. 2d shows SEM images of TM6 as-synthesized (upper panel) and as shaker-milled with carbon black (lower panel). FIG. 2e shows TEM/EDS mapping of the elemental distribution in a particle cluster of the as-synthesized TM6. FIG. 2f shows $^{19}F$ frequency-stepping NMR spectra obtained by summing over multiple spin echo sub-spectra acquired at different excitation frequencies, with the spectra scaled according to the amount of sample in the rotor, and with $^{19}F$ spin echo spectra collected on LiF powder overlaid for comparison.

FIGS. 3a-3c show voltage profiles and capacity retention (1.5-4.7V, at 20 mA $g^{-1}$; RT) for the TM2, TM4, TM6 compositions, respectively. FIG. 3d shows the voltage profile and capacity retention of TM6 (2.0-4.5V, at 20 mA $g^{-1}$; RT). FIG. 3e shows the first cycle voltage profiles of the TM2, TM4, and TM6 compositions from galvanostatic intermittent titration tests (GITT).

FIGS. 4a-4c show TEM electron diffraction (ED) patterns for the TM2, TM4, TM6 compositions, respectively, along the zone axis [100]. FIGS. 4*d*-4*f* show the rate capacity of the TM2, TM4, and TM6 compositions, respectively, as cycled between 1.5-4.7 V at various rates.

DETAILED DESCRIPTION OF THE INVENTION

The following disclosure discusses the present invention with reference to the examples shown in the accompanying drawings, though does not limit the invention to those examples.

Figure 1:
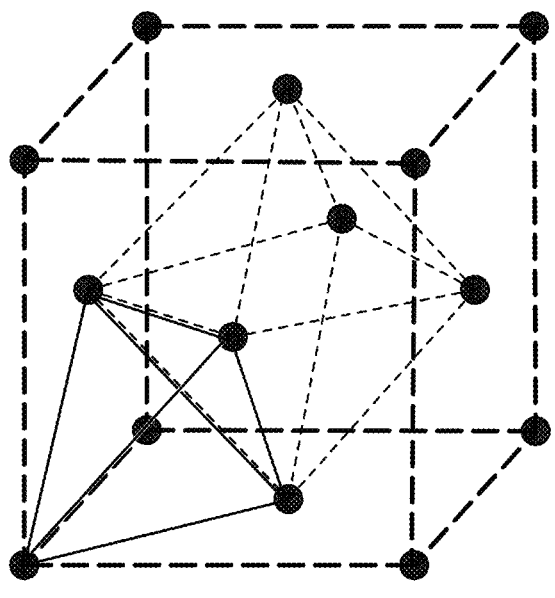
FIG. 1 shows a face-center cubic (FCC) unit cell cation sublattice. The relationship between cation octahedron and tetrahedron structures is also shown.

To facilitate a better understanding of the testing carried out, and the structural origin of the improvements made possible under a high entropy DRX design strategy of the present invention, reference is made to FIG. 1 which shows a face-center cubic (FCC) unit cell cation sublattice with the relationship between cation octahedron and tetrahedron structures.

In a random mixture with short-range order (SRO), the probability that a site (such as those depicted in FIG. 1) is occupied by a certain species is determined in part by the occupancy of the neighboring site. Normally, a random mixture is one where the species distributed over a set of sites is randomly assigned without any consideration of the occupation of the neighboring sites. As an example, in a normal random mixture of A and B cations with mole fraction $x_A$ and $x_B$, the probability that a site is occupied by A is $P_A = x_A x_A$, and the probability that the site is occupied by B is $P_B = x_B$. Because the occupations of the sites are uncorrelated, the probability that a specific pair of nearest neighbor sites is of type AA is equal to $P_{AA} = P_A * P_A = x^2_A$. Similar expressions apply for pairs of nearest neighbor sites of the types BB ($P_{BB} = P_B * P_B = x^2_B$) and AB ($P_{AB} = P_A * P_B = x_A x_B$).

However, in a random mixture with SRO, because the probability that a site is occupied by a certain species is influenced in part by the occupancy of the neighboring site, the probability that a specific pair of nearest neighbor sites is of the type AB is not the same as in a normal random mixture. That is, because the fact that A is present on a first site will influence the probability that B is present on a neighbor site, the probability $P_{AB} \neq P_A * P_B$. Such influences of SRO correlations are not limited to only the nearest neighboring bonds, and can extend longer distances to further separated sites. These deviations from randomness are called short-range order or "SRO" and can be measured by a variety of techniques, including single-crystal X-ray scattering and electron diffraction in TEM. [7-8]. SRO can also be inferred from a variety of other techniques including pair distribution functions obtained from neutron diffraction [6]. High entropy DRX design strategies according to the present invention are directed at mitigating SRO formation so as to yield improvements in capacity and rate performance, as shown by testing carried out under the present invention.

Figure 2A:
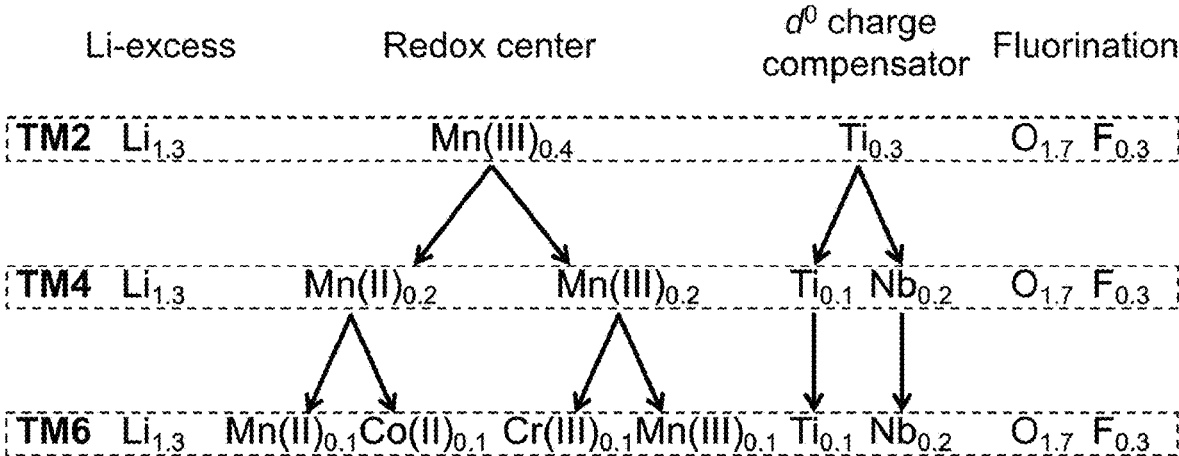
FIGS. 2a-f show the design and structural characterization of the synthesized prototype materials TM2, TM4, and TM6.

To illustrate advantages of a high entropy DRX design strategy, there was formed three prototype compositions TM2, TM4, and TM6. As shown in FIG. 2*a*, these illustrative compositions differ in the transitional metal species present, while Li, O, and F (if present) are kept constant, with Li present in excess.

Each of the prototype compositions (TM2, TM4, and TM6) featured 30% Li-excess (i.e., $Li_{1.3}$ per formula unit) as an amount sufficient to enable good Li transport, while avoiding undesirable limitations on TM redox capacity. In the prototype compositions there was 15% fluorine substitution to further increase the TM redox reservoir. In a first prototype composition, the combination of Mn$^{3+}$ and Ti$^{4+}$ was designed as a baseline TM composition for illustrative testing purposes, resulting in $Li_{1.3}Mn^{3+}_{0.4}Ti_{0.3}O_{1.7}F_{0.3}$ (referred to hereafter as TM2). In another prototype composition, Mn$^{2+}$ and Nb$^{5+}$ were further incorporated into the baseline composition TMs to form $Li_{1.3}Mn^{2+}_{0.2}Mn^{3+}_{0.2}T_{0.1}Nb_{0.2}O_{1.7}F_{0.3}$, thereby resulting in a composition with four TM species (referred to hereafter as TM4). In a further prototype composition, Mn$^{2+}$, Nb$^{5+}$, Co$^{2+}$, and Cr$^{3+}$ were added to the baseline composition to form $Li_{1.3}Mn^{2+}_{0.1}Co^{2+}_{0.1}Cr^{3+}_{0.1}Mn^{3+}_{0.1}Ti_{0.1}Nb_{0.2})_{1.7}F_{0.3}$, thereby resulting in a composition with six TM species (referred to hereafter as TM6).

Though the present invention addresses three prototype compositions having two, four and six TM species respectively, it will be understood that the present invention is inclusive of compositions having other numbers of TM species. For example, the present invention may include compositions with five TM species, such as: $Li_{1.3}Mn^{2+}_{0.1}Co^{2+}_{0.1}Mn^{3+}_{0.2}Ti_{0.1}Nb_{0.2}O_{1.7}F_{0.3}$, or $Li_{1.3}Mn^{2+}_{0.2}Cr^{3+}_{0.1}Mn^{3+}_{0.1}Ti_{0.1}Nb_{0.2}O_{1.7}F_{0.3}$; and may also include compositions with seven TM species, such as: $Li_{1.3}Mn^{2+}_{0.1}Co^{2+}_{0.1}Cr^{3+}_{0.1}Mn^{3+}_{0.1}Ti_{0.1}Nb_{0.1}Ta_{0.1}O_{1.7}F_{0.3}$. These five and seven TM species examples (i.e., TM[5] and TM[7]) are non-limiting, and the present invention may likewise comprise compositions of any number of TM species that meet the further criteria set forth herein.

Synthesis

Compounds according to the present invention can be synthesized using conventional techniques by combining a collection of stoichiometric compounds composed of Li, TMs, O, and optionally F to yield a precursor powder which is then mechanically mixed to obtain the phase pure powder through mechanochemical alloying. The DRX oxyfluoride compound examples described herein were synthesized by the noted traditional solid-state methodology with guidance provided by the present invention's FIG. 2*a* prototype composition design of DRX cathodes with different numbers of TMs (TM[n]).

The prototype compositions TM2, TM4, and TM6, as well as the additional six DRX compounds as comparatives were each synthesized with $Li_2CO_3$ (Alfa Aesar, ACS, 99% min), MnO (Alfa Aesar, 99%), CoCO$_3$ (Alfa Aesar, 99.5%), Mn$_2$O$_3$ (Alfa Aesar, 99.9%), Cr$_2$O$_3$ (Sigma-Aldrich, 98%), TiO$_2$ (Alfa Aesar, 99.9%), Nb$_2$O$_5$ (Sigma-Aldrich, 99.99%) and LiF (Alfa Aesar, 99.99%) used as precursors. All the precursors were stoichiometrically mixed (except for adding 10% more $Li_2CO_3$ and 5% more $CoCO_3$ in order to compensate possible loss during synthesis) with a Retsch PM 400 planetary ball mill at a rate of 180 rpm for 12 hours. The precursors were then dried in 70° C. oven overnight and pelletized. The precursor pellets were pre-heated at 600° C. for 3 hours, followed by sintered at 1,000° C. under argon atmosphere, except for all TM2 compounds, MCN and MCT, which were sintered at 1,050° C. The duration of sintering was 6 hours. The pellets were then fast cooled in an argon atmosphere, transferred to a glovebox, and ground into powders. All DRX compositions were successfully synthesized using traditional solid-state methods.

Electrochemistry

Figure 3A:
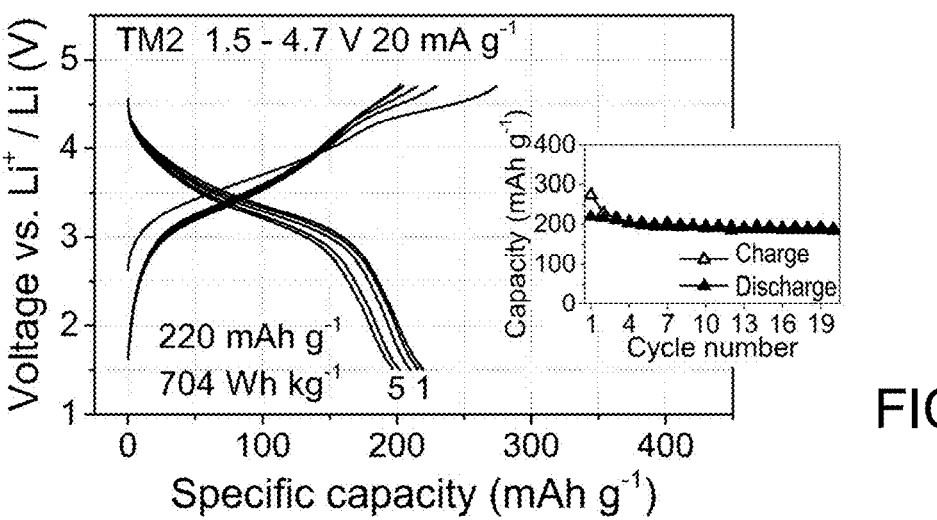
FIGS. 3a-e show the electrochemical performance of the TM2, TM4, and TM6 prototype compositions.
Figure 3B:
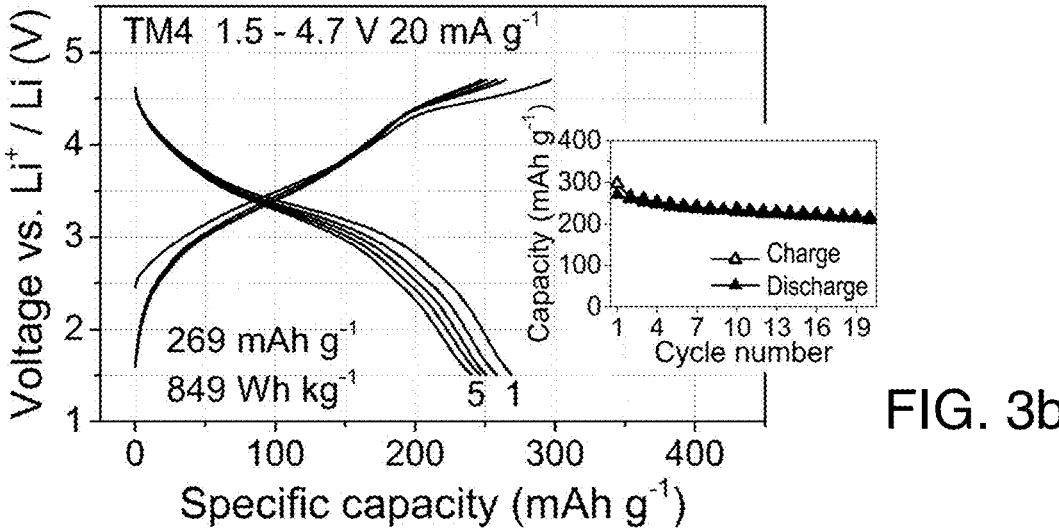
Figure 3C:
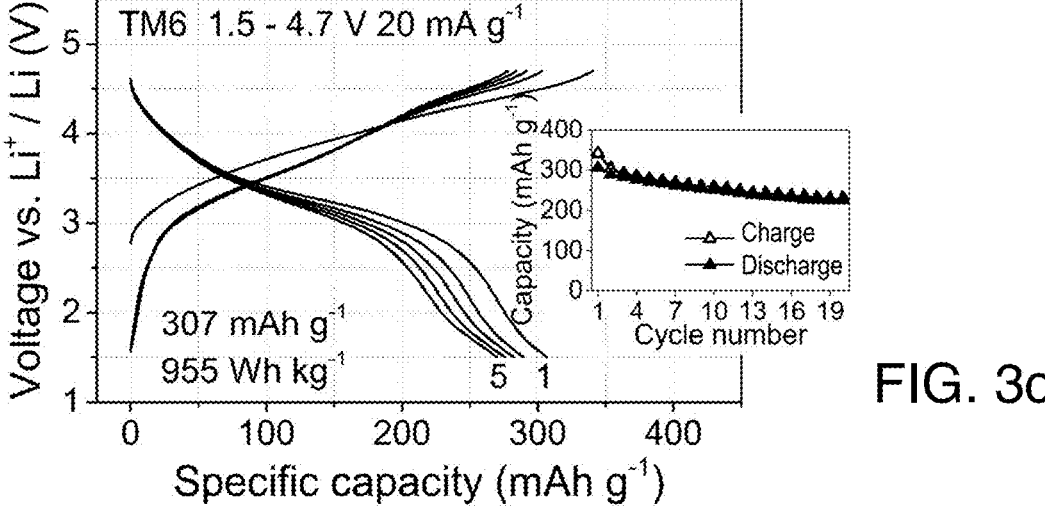
Figure 3D:
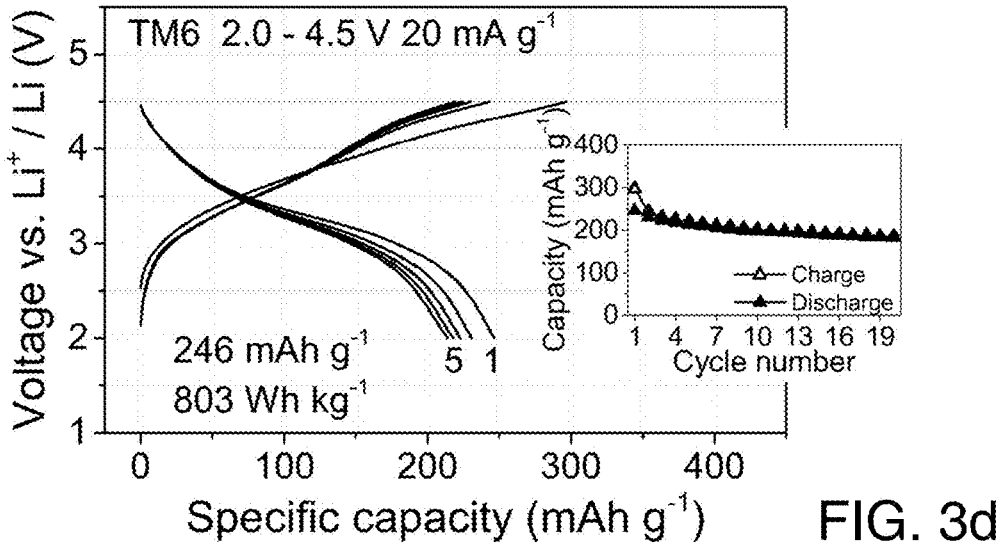
Figure 3E:
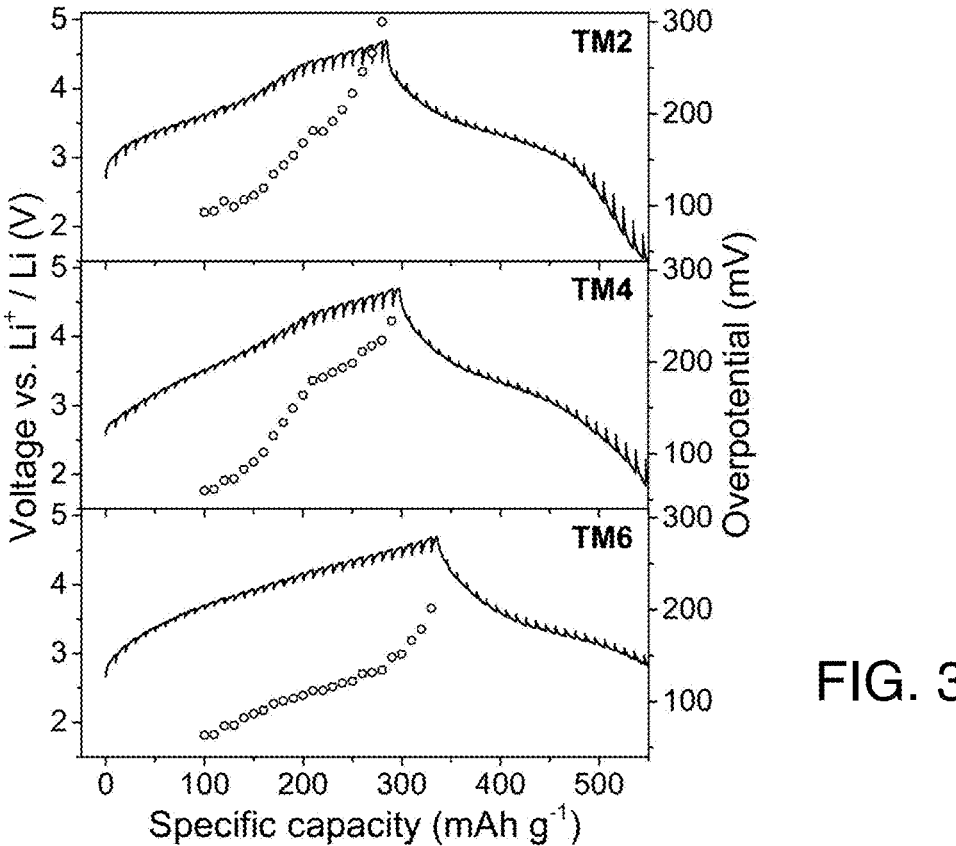

To enable illustration of the examples in use as a cathode, there was produced cathode films comprising the noted synthesized compounds. All cathode films thus produced were composed of active materials, SUPER C65 (Timcal), and polytetrafluoroethylene (PTFE, DuPont, Teflon 8A) at a weight ratio of 70:20:10. To make the cathode films, 280 mg as-synthesized active materials and 80 mg SUPER C65 were mixed and shaker-milled for 90 minutes in argon atmosphere with SPEX 800M Mixer/Mill, and PTFE was later added and manually mixed with the shaker-milled mixture for 40 minutes. The components were then rolled into thin films inside the glovebox. Commercialized 1M $LiPF_6$ in ethylene carbonate (EC) and dimethyl carbonate (DMC) solution (volume ratio 1:1) was used as electrolyte. Glass microfibers (Whatman) were used as separator. FMC Li metal foil was used as an anode. Coin cells were assembled inside the glovebox and tested on an Arbin battery test instrument at room temperature. The loading density of the films was around 3-4 $mg/cm^2$ based on active materials. For rate capability tests, a smaller loading density of around 2.5 $mg/cm^2$ based on active materials was used. The specific capacities were then calculated based on the weight of active materials (70%) in the cathode films. FIG. 3e shows cycle voltage profiles for the TM2, TM4, and TM6 prototype compositions from galvanostatic intermittent titration tests (GITT). For these GITT measurements, each step in the voltage profiles corresponds to a galvanostatic charge/discharge of 10 mAh/g at a rate of 20 mA/g followed by a six-hour relaxation step. The over-potentials at each step between 100 mAh $g^{-1}$ charged states and the top of charge state states are calculated and plotted as dots in the figures Characterization Synchrotron X-ray diffraction (XRD) patterns for the as-synthesized compounds were collected at Beamline 28-ID-2 in Brookhaven National Lab. Rietveld refinement was done with PANalytical X'pert HighScore Plus software. Scanning electron microscopy (SEM) images were collected using a Zeiss Gemini Ultra-55 Analytical Field Emission SEM in the Molecular Foundry at Lawrence Berkeley National Lab (LBNL). Scanning transmission electron microscopy (STEM), energy dispersive spectroscopy (EDS), and electron diffraction (ED) measurements were performed on a JEM-2010F microscope equipped with an X-mas EDS detector in the Molecular Foundry at LBNL. Neutron powder diffraction was measured at Nanoscale Ordered Materials Diffractometer (NOMAD) at the Spallation Neutron Source in Oak Ridge National Laboratory. Samples for neutron diffraction experiment were prepared using $^7Li$ enriched precursors ($^7LiF$ and $^7Li_2CO_3$). The refinement was performed using TOPAS software.

Solid-State Nuclear Magnetic Resonance (NMR) Spectroscopy ssNMR data were collected on TM2, TM4, and TM6 pristine powders using a Bruker Avance 300 MHz (7.05 T) wide-bore NMR spectrometer with Larmor frequencies of 282.40 MHz and 116.64 MHz, respectively, at room temperature. The data were obtained at 60 kHz magic-angle spinning (MAS) using a 1.3 mm double-resonance HX probe. $^{19}F$ and $^7Li$ NMR data were referenced against lithium fluoride (LiF, $\delta(^{19}F)$=−204 ppm, and $\delta(^7Li)$=−1 ppm). Lineshape analysis was carried out within the Bruker Topspin software using the SOLA lineshape simulation package. The resonant frequency range of $^{19}F$ nuclei in TM2, TM4, and TM6 was larger than the excitation bandwidth of the RF pulse used in the NMR experiment. To obtain the full spectrum, eleven spin echo spectra were collected for TM2 and nine spin echo spectra were collected for TM4 and TM6. These were done in frequency steps of 140 ppm (739.5 kHz) from −759 to 361 ppm, where the step size was slightly less than the excitation bandwidth of the RF pulse. Individual sub-spectra were processed using a zero-order phase correction and then added to give an overall sum spectrum in absorption mode that required no further phase correction. This method—termed 'frequency stepping', 'spin echo mapping', or 'VOCS' (variable offset cumulative spectrum)—uniformly excites the broad $^{19}F$ signals by providing a large excitation bandwidth. Individual $^{19}F$ spin echo spectra were collected using a 90° RF pulse of 5.2 μs and a 180° RF pulse of 10.4 μs at 100 W, with a recycle delay of 30 ms. For reference, a spin echo spectrum was collected on LiF using similar RF pulses but with a recycle delay of 30 s. A $^{19}F$ spectrum obtained on the empty probe using similar acquisition parameters as for $^{19}F$ spectra collected on the DRX samples showed no significant background signal.

Results and Discussion

The high entropy DRX design strategy was confirmed using the three prototype compositions TM2, TM4, and TM6, each of which is characterized by an excess of lithium, a redox center, a $d^0$ compensator and a fluorination agent according to the general formula LiTMOF, with the TM species included as components of the redox center and the $d^0$ charge compensator.

Figure 2C:
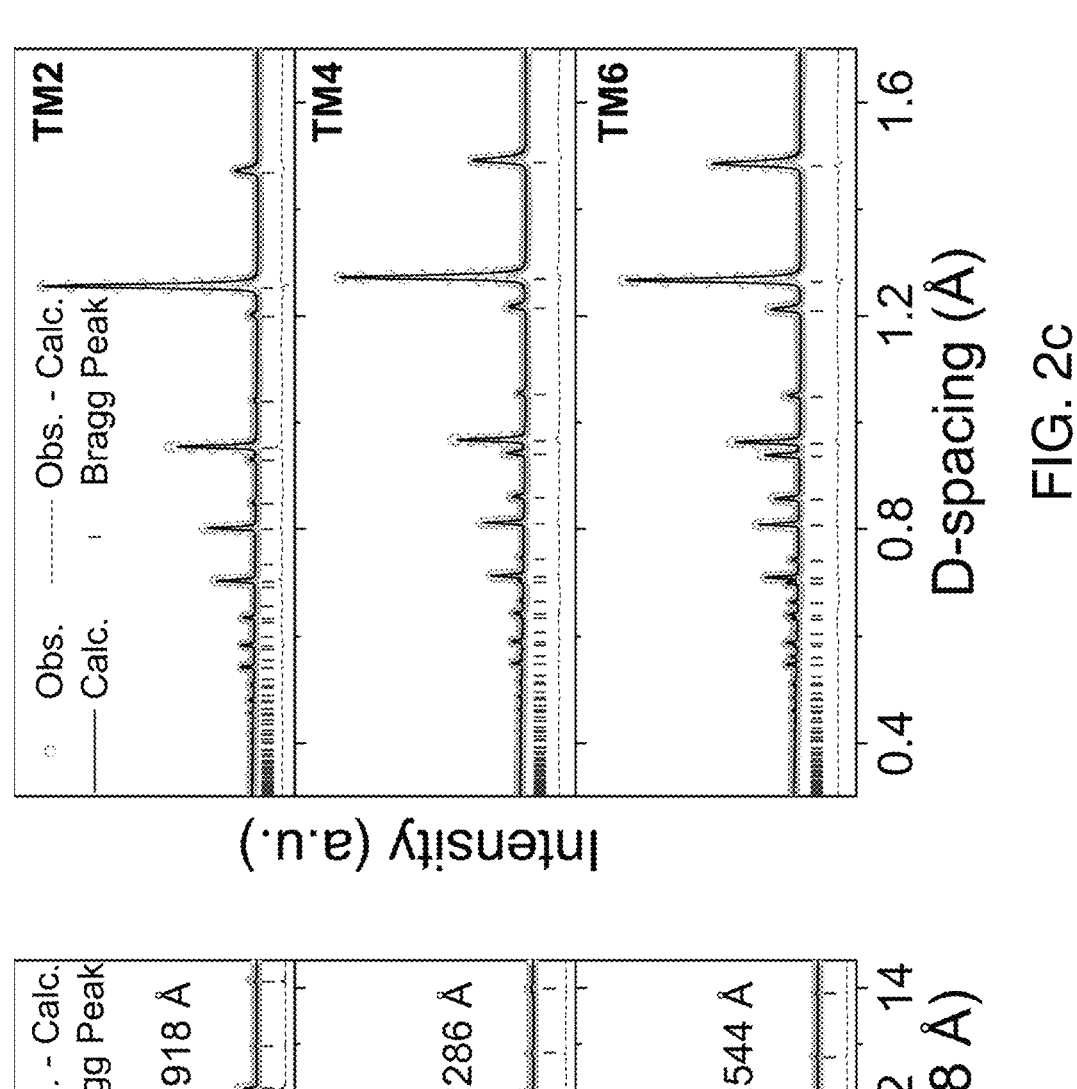
Figure 2B:
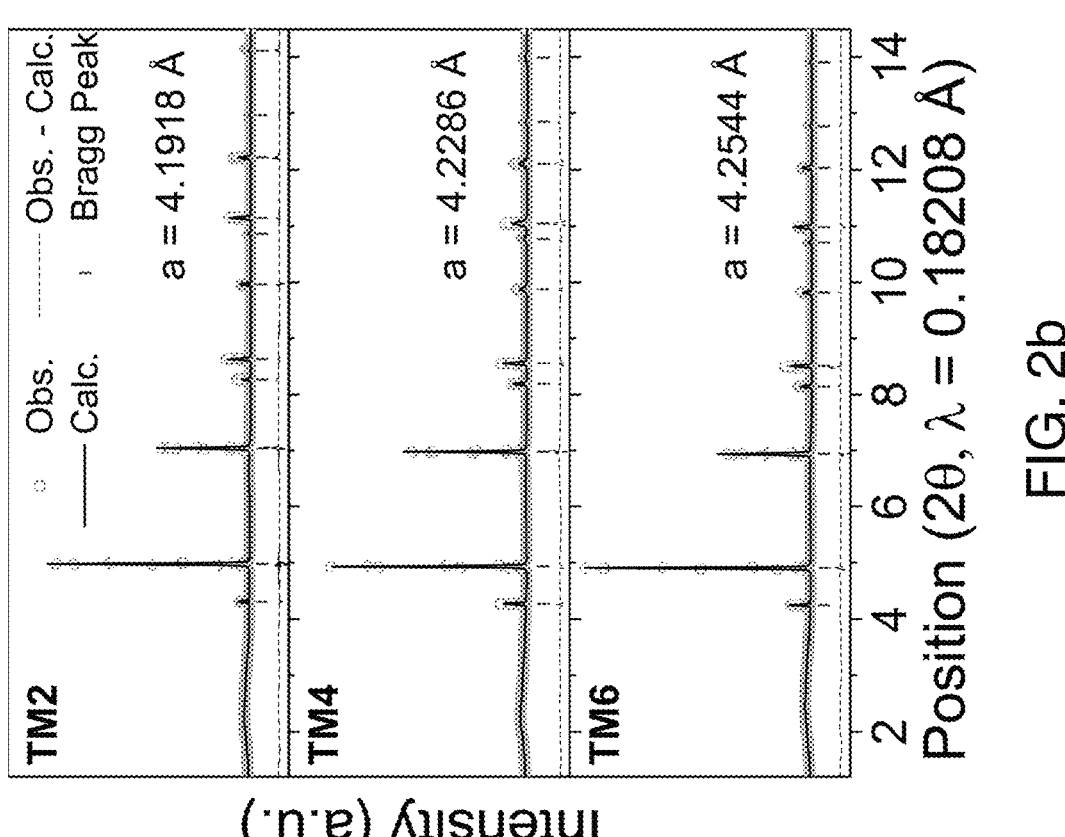
Figure 2D:
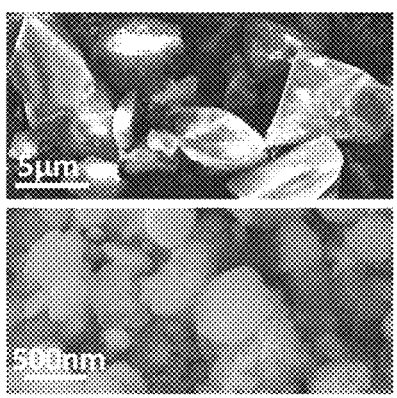

Scanning electron microscopy (SEM) shows that the particle size of the as-synthesized material reaches around 5-10 μm (FIG. 2d, upper panel) and can be reduced to 200-500 nm (FIG. 2d, lower panel) after shakermill with carbon during electrode fabrication. Synchrotron X-ray diffraction (XRD) patterns and time-of-flight (TOF) neutron diffraction patterns confirm the formation of pure DRX structures with no observable impurity peaks, as shown in FIGS. 2b and 2c, respectively. Rietveld refinement of the compositions yielded lattice constants of 4.1918 Å, 4.2286 Å, and 4.2544 Å for TM2, TM4, and TM6, respectively.

Figure 2E:
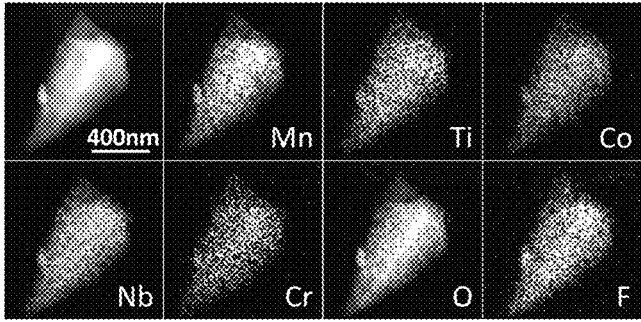
Figure 2F:
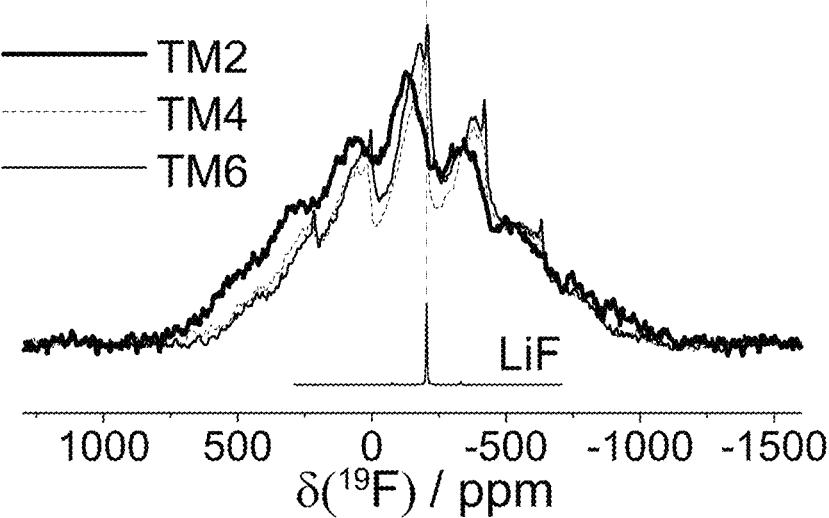

Energy-dispersive spectroscopy (EDS) mapping using a transmission electron microscope (TEM) was applied to confirm the uniform distribution of multi-elements in the materials. FIG. 2e shows the TEM/EDS mapping on a representative particle of as-synthesized TM6, it being evident from the images that the different TMs, as well as F, were distributed uniformly in the whole particle. $^{19}F$ nuclear magnetic resonance (NMR) measurement was further conducted to confirm the bulk incorporation of F into the DRX lattice, as shown in FIG. 2f. It can be seen that the $^{19}F$ NMR spectra collected on the as-synthesized DRX materials differ significantly from that of the LiF reference, with the spectra of the former composed of several broad, overlapping signals, which arise from strong paramagnetic interactions from short-range paramagnetic interactions between unpaired d electrons on TM ions and the F nucleus, and which are shifted away from the resonance frequency of LiF at −204 ppm. This confirms that a vast majority of the F ions are incorporated into the DRX phase.

The electrochemical performance of the three prototype materials were first evaluated using galvanostatic cycling tests. When cycled between 1.5 and 4.7 V at a rate of 20 mA/g, TM2 delivers a high capacity (specific energy) of 220 mAh/g (704 Wh/kg), as shown in FIG. 3a. With an increased number of TM species in the DRX structure, TM4 demonstrates a higher capacity of 269 mAh/g (849 Wh/kg), as shown in FIG. 3b; and with a yet higher number of TM species, the capacity of TM6 further increases to 307 mAh/g (955 Wh/kg), as shown in FIG. 3c. For the higher entropy TM6 compound, even when cycled at a smaller voltage window of 2.0-4.5V, the compound still delivers a high discharge capacity (specific energy) of 246 mAh/g (803 Wh/kg), as shown in FIG. 3d.

That the superior performance results from the overall entropic effect rather than the incorporation of any specific transition metal ion is further supported by testing done in which a number of comparative compounds were synthesized similar to that of TM6, though with low entropy designs. By evaluating similar compounds as TM6, though with a design having fewer components that thus slack the benefits of a high entropy design, there may thus be better recognized the effect of a high entropy separate from any effects that are a product of the different transition metals used in the high entropy design.

Figure 6A:
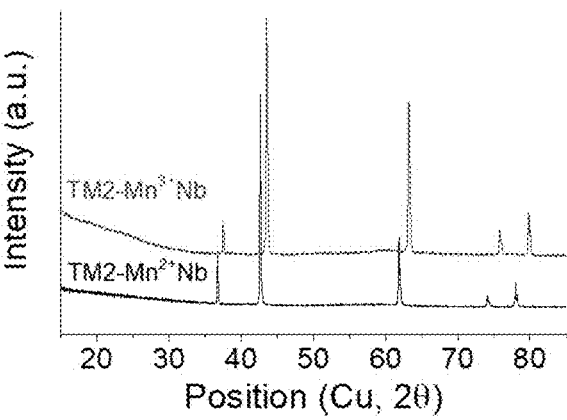
FIGS. 6*a*-6*c* show details of comparative DRX materials TM2-Mn$^{2+}$Nb and TM2-Mn$^{3+}$Nb, with FIG. 6*a* showing XRD patterns of the two comparative DRX materials, FIG. 6*b* showing the voltage profile and capacity retention of TM2-Mn$^{2+}$Nb, and FIG. 6*c* showing the voltage profile and capacity retention of TM2-Mn$^{3+}$Nb.
Figure 6B:
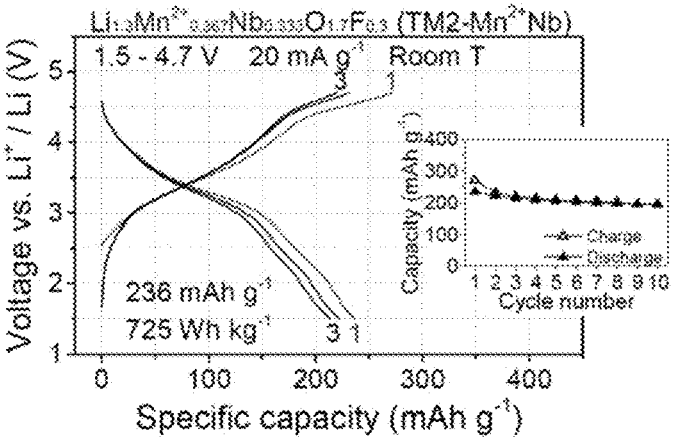
Figure 6C:
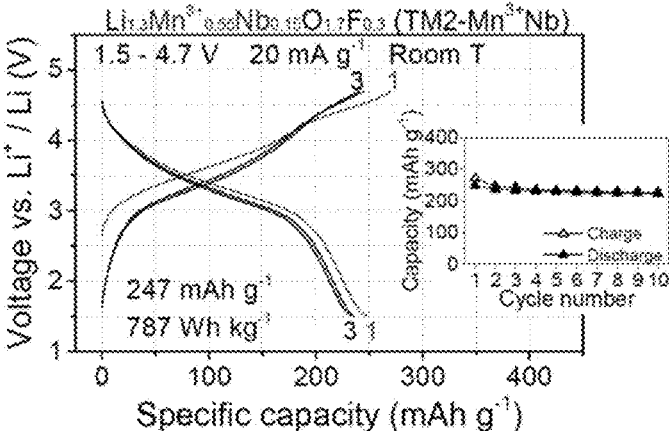

In a first test, performance of TM4 ($Li_{1.3}Mn^{2+}_{0.2}Mn^{3+}_{0.2}Ti_{0.1}Nb_{0.2}O_{1.7}F_{0.3}$), as shown in FIG. 3b, was compared to performance of binary DRXs that contain subgroups of the four TMs used in TM4. The binary DRXs include the prior discussed TM2 ($Li_{1.3}Mn^{3+}_{0.4}Ti_{0.3}O_{1.7}F_{0.3}$), as shown in FIG. 3a, as well as two additional binaries of $Li_{1.3}Mn^{2+}_{0.367}Nb_{0.333}O_{1.7}F_{0.3}$ (TM2-$Mn^{2+}$Nb) and $Li_{1.3}Mn^{3+}_{0.55}Nb_{0.15}O_{1.7}F_{0.3}$ (TM2-$Mn^{3+}$Nb), as shown in FIGS. 6a-6c. These four compounds each share the same prototype composition "$Li_{1.3}TM_{0.7}O_{1.7}F_{0.3}$", and were synthesized using the same solid state method. It is noted that another binary compound $Li_{1.3}Mn^{2+}_{0.2}Ti_{0.5}O_{1.7}F_{0.3}$ cannot be obtained as pure phase, as that product contains a second phase of LiF. Among these four compounds, the three binaries (TM2; TM2-$Mn^{2+}$Nb; and TM2-$Mn^{3+}$Nb) cover all the elements present in the quaternary (TM4).

It was found that each of the binary compounds exhibits a smaller capacity than that of the quaternary compound—with TM2 exhibiting a capacity of 220 mAh $g^{-1}$ (FIG. 3a), TM2-$Mn^{2+}$Nb providing a capacity of 236 mAh $g^{-1}$ (FIG. 6b), and TM2-$Mn^{3+}$Nb having a capacity of 247 mAh $g^{-1}$ (FIG. 6c), which are each smaller than the capacity of TM4 at 269 mAh $g^{-1}$ (FIG. 3b). These results confirm that better electrochemical performance is achieved by mixing TM species with a high entropy configurational, apart from interactions that resulting from the mere mixing of TM mixtures alone.

Additional testing was done to evaluate the results that are achieved through the inclusion of the metal species $Co^{2+}$ and $Cr^{3+}$, which are included in TM6 though not in TM4.

Figure 7A:
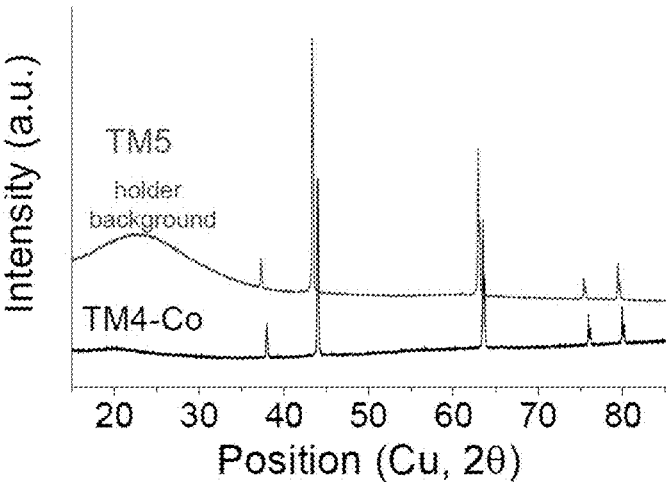
FIGS. 7*a*-7*c* show details of comparative DRX materials TM4-Co and TM5, with FIG. 7*a* showing XRD patterns of the two comparative DRX materials, FIG. 7*b* showing the voltage profile and capacity retention of TM4-Co, and FIG. 7*c* showing the voltage profile and capacity retention of TM5.
Figure 7B:
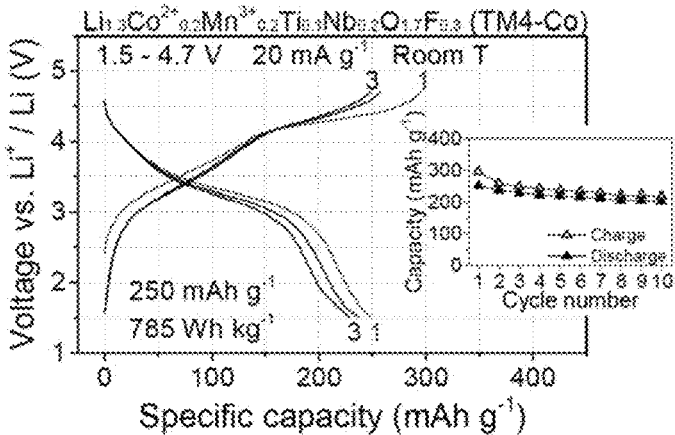
Figure 7C:
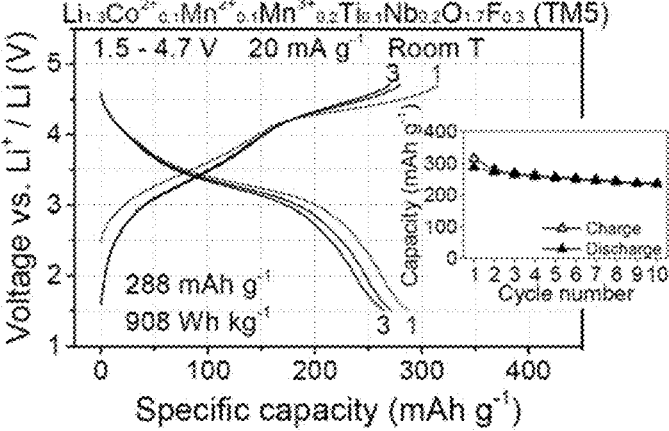

The effects of the $Co^{2+}$ species were studied based on a comparison of the two compositions of $Li_{1.3}Co^{2+}_{0.2}Mn^{3+}_{0.2}Ti_{0.1}Nb_{0.2}O_{1.7}F_{0.3}$ (TM4-Co) and $Li_{1.3}Co^{2+}_{0.1}Mn^{2+}_{0.1}Mn^{3+}_{0.2}Ti_{0.1}Nb_{0.2}O_{1.7}F_{0.3}$ (TM5) as shown in FIGS. 7a-7c, alongside TM4 ($Li_{1.3}Mn^{2+}_{0.2}Mn^{3+}_{0.2}Ti_{0.1}Nb_{0.2}O_{1.7}F_{0.3}$), as shown in FIG. 3b. Again, a higher entropic composition was observed to have a superior capacity—with TM5 exhibiting a capacity of 288 mAh $g^{-1}$ (FIG. 7c), as compared to the lower capacities of TM4 at 269 mAh $g^{-1}$ (FIG. 3b) and TM4-Co at 250 mAh $g^{-1}$ (FIG. 7b). These results confirm that better electrochemical performance is achieved from mixing multiple TM species with a high entropy configurational, apart from interactions resulting from the inclusion of $Co^{2+}$ on its own.

Figure 8A:
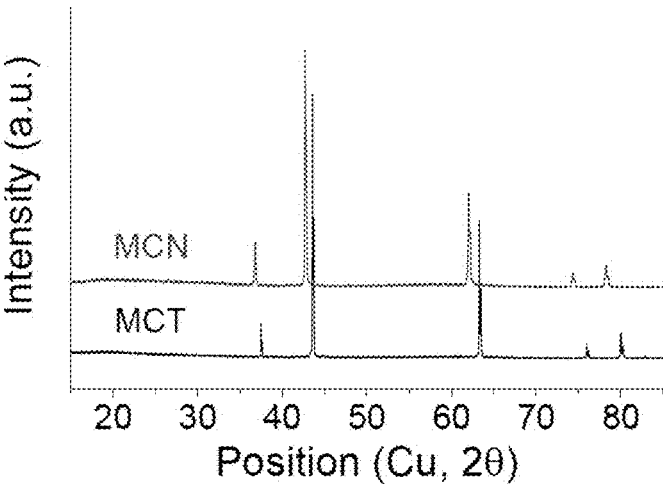
FIGS. 8*a*-8*c* show details of comparative DRX materials MCN and MCT, with FIG. 8*a* showing XRD patterns of the two comparative DRX materials, FIG. 8*b* showing the voltage profile and capacity retention of MCN, and FIG. 8*c* showing the voltage profile and capacity retention of MCT.
Figure 8B:
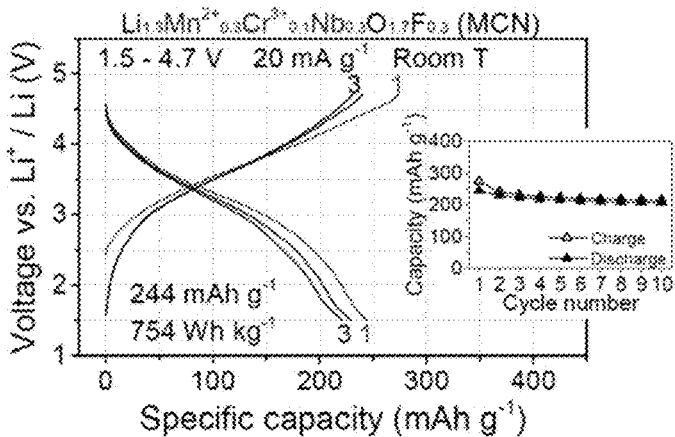
Figure 8C:
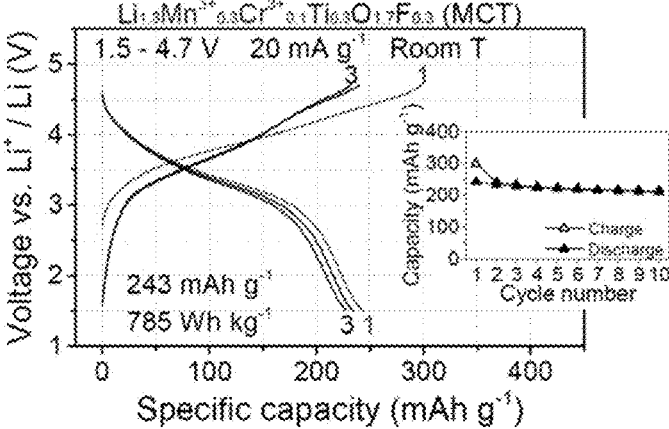

The effects of the $Cr^{3+}$ species were studied by comparing two Cr-containing ternary compounds, $Li_{1.3}Mn^{2+}_{0.3}Cr^{3+}_{0.1}Nb_{0.3}O_{1.7}F_{0.3}$ (MCN) and $Li_{1.3}Mn^{3+}_{0.3}Cr^{3+}_{0.1}Ti_{0.3}O_{1.7}F_{0.3}$ (MCT), as shown in FIGS. 8a-8c, relative to the TM6 ($Li_{1.3}Mn^{2+}_{0.1}Co^{2+}_{0.1}Mn^{3+}_{0.1}Cr^{3+}_{0.1}Ti_{0.1}Nb_{0.2}O_{1.7}F_{0.3}$) compound, as shown in FIG. 3c. The $Cr^{3+}$ concentration (0.1 per f.u.) in the two ternaries is the same as that in the TM6 compound. Binary compounds were not used for this comparison as the low solubility of $Cr^{3+}$ in DRXs precludes phase-pure Cr-based binary DRX compounds using the same synthesis method by which the aforementioned compounds are produced. Comparison of these compounds again revealed that a higher entropic composition provided a superior capacity—with TM6 having a much larger capacity pf 307 mAh $g^{-1}$ (FIG. 3c), as compared to the lower capacities of MCN at 244 mAh $g^{-1}$ (FIG. 8b) and MCT at 243 mAh $g^{-1}$ (FIG. 8c). Similar to the earlier test, these results confirm that better electrochemical performance is achieved from mixing multiple TM species with a high entropy configurational, apart from interactions resulting from the inclusion of $Cr^{3+}$ on its own.

While note being bound by theory, it is believed that this series of experiments confirms that the increasing improvements realized in going from TM2, to TM4, to TM6 are not attributed to any direct or indirect effect of a specific TM (e.g. electronic structure or size), or even a specific combination of TMs, but is instead a result of the synergy in having an increasingly greater number of TMs together, in a high entropy design.

Galvanostatic intermittent titration tests (GITT) were also conducted to investigate the polarization in the three prototype materials, as shown in FIG. 3e. Overpotential at each GITT step between 100 mAh/g charged states and the top of charge states were also calculated. It can be observed that the polarization is greatly reduced when more TM species are incorporated into the DRX lattice, as evidenced by the reduced voltage relaxation.

Figure 4A:
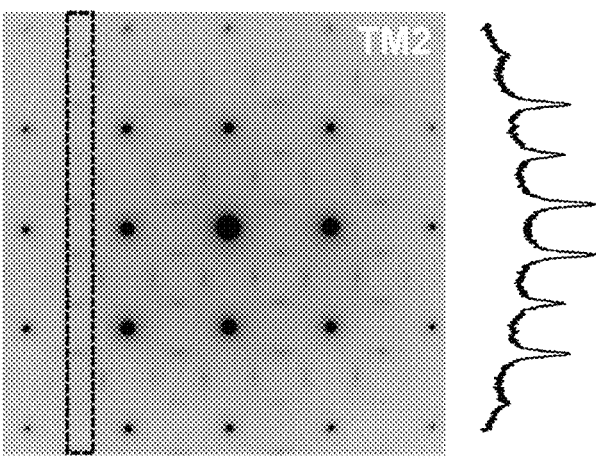
FIGS. 4a-f show short range order and Li transport analyses of the TM2, TM4, and TM6 compositions.
Figure 4B:
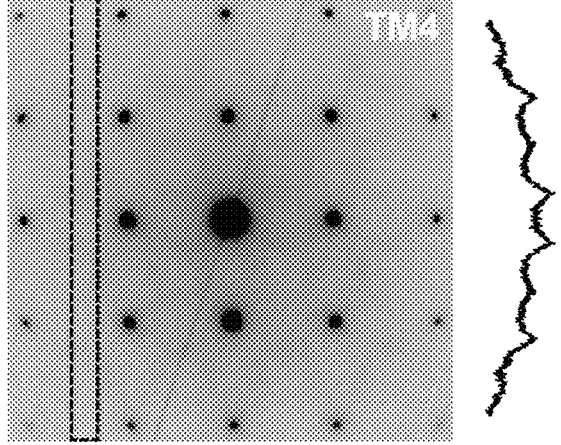
Figure 4C:
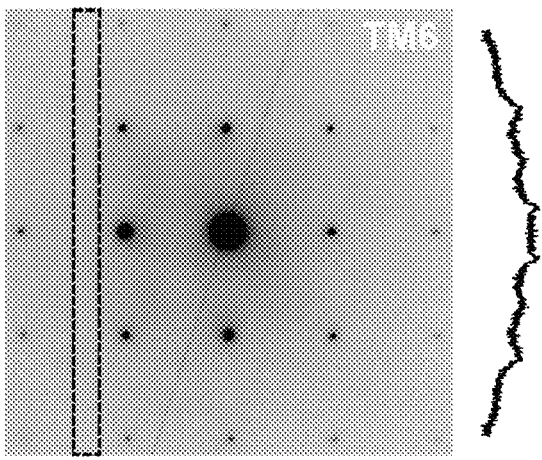

The local SRO of the three prototype materials were evaluated using TEM electron diffraction (ED), as shown in FIGS. 4a-4c. The round spots, which originate from the long-range order in the materials, are indexed to be Fm-3m space group. The square-like diffuse scattering patterns are attributed to the SRO. Quantifications of SRO pattern intensity, obtained by integrating the counts within the dashed rectangular regions, are displayed to the right of the corresponding ED patterns.

Figure 5A:
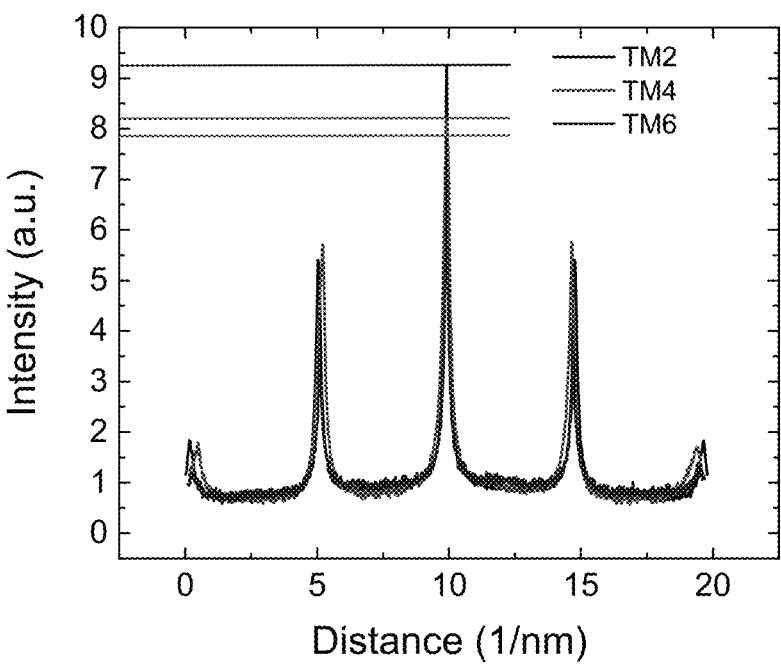
FIGS. 5*a*-5*b* show SRO intensity patterns, with FIG. 5*a* showing SRO intensities based on normalization of the TEM diffraction pattern of FIGS. 4*a*-4*c*, and FIG. 5*b* showing comparative SRO maximum intensities of the separate prototype materials from FIGS. 4*a*-4*c*.

To illustrate the comparative differences in SRO intensities for each of the prototype materials, the TEM diffraction patterns for each material was normalized by integrating the Bragg diffraction intensity of the Bragg diffraction patterns in the first column left-of-center. The normalized SRO intensities are shown in FIG. 5a, with distance (1/nm) along the horizontal axis and intensity (atomic unit—a.u.) along the vertical axis. The relative SRO intensities of the individual materials were then compared by assessing the maximum intensity values in the second column left-of-center (as noted by rectangular sections in FIGS. 4a-4c) relative to the overall integrated intensity for the respective image.

Figure 5B:
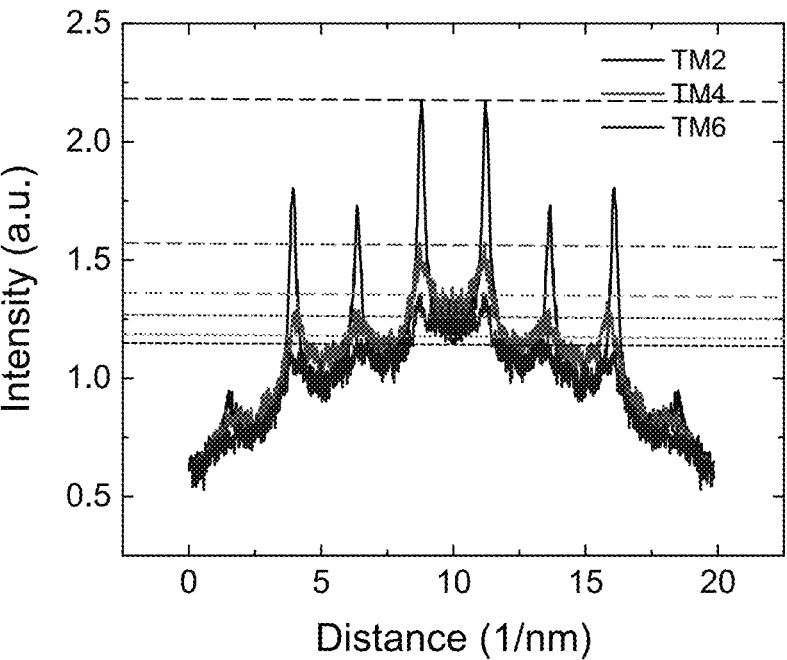

Comparative SRO intensities of the prototype materials may be seen in FIG. 5b, which provides an overlay of the SRO intensities from FIGS. 4a-4c with approximated maximum intensities identified by long-dash broken lines and approximated baseline intensities identified by short-dash broken lines. As illustrated in FIG. 5b, the TM2 sample was observed to yield a maximum intensity of approximately 2.20 a.u. relative to a base intensity of approximately 1.13 a.u. (an SRO intensity that is around 1.07 a.u. larger than the background intensity); the TM4 sample was observed to yield a maximum intensity of approximately 1.56 a.u. relative to a base intensity of approximately 1.25 a.u. (an SRO intensity that is approximate 0.31 a.u. larger than the background intensity); the TM6 sample was observed to yield a maximum intensity of approximately 1.38 a.u. relative to a base intensity of approximately 1.19 a.u. (an SRO intensity that is approximate 0.19 a.u. larger than the background intensity). Thus, as illustrated by the example in FIG. 5b, there is observed an inverse relation between entropy and SRO intensity in the prototype materials TM2, TM4, and TM6, with increasing entropies correlating to reduced SRO intensities. Thus, with an increasing number of TM species from TM2 to TM4 to TM6, the SRO in the DRX structures is largely defeated, as evidenced by the reduced SRO signal intensities in the electron diffractions.

Figure 4D:
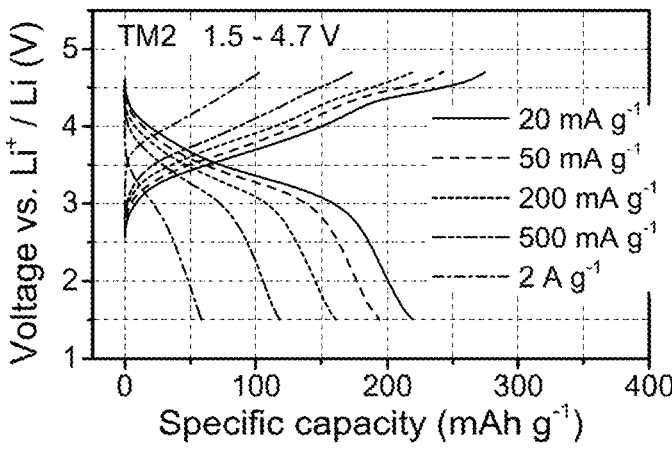
Figure 4E:
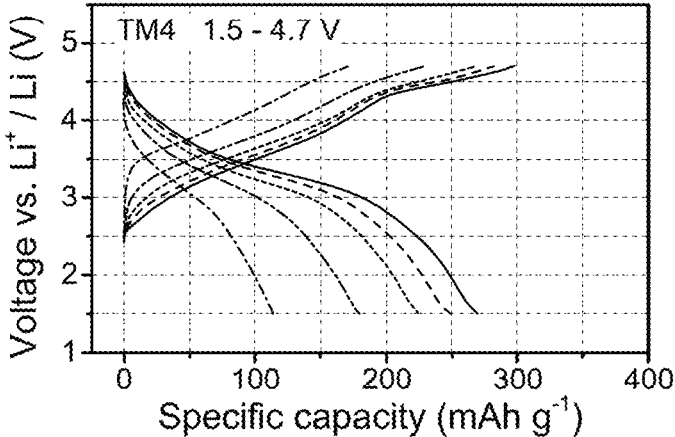
Figure 4F:
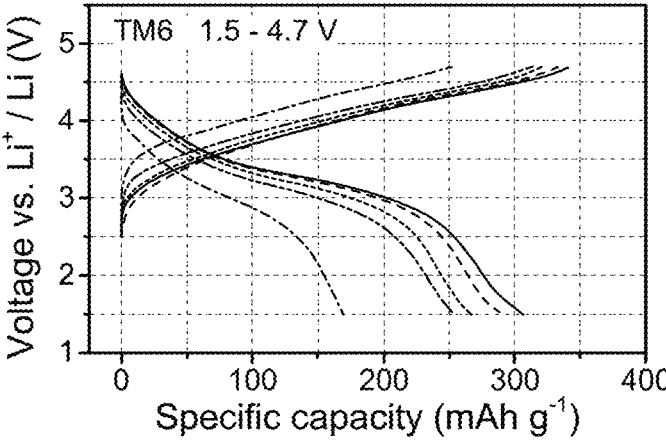

While not being bound by any theory, the reduced SRO is considered to lead to an improved Li transport property, and thus a higher capacity and improved rate capability. This is supported by the differences in rate performance measurements of the three materials, as can be seen from a comparison of FIGS. 4d-4f. As seen in FIG. 4d, for TM2, discharge capacities of 220 mAh/g and 58 mAh/g are observed when cycled at 20 mA/g and 2000 mA/g, respectively, corresponding to a 74% capacity loss from the lower rate to the higher rate. An improved capacity retention is achieved with TM4, as evidenced by a 58% loss between discharge capacities of 269 mAh/g and 114 mAh/g when cycled at 20 mA/g and 2000 mA/g, respectively, as seen in FIG. 4e. A further improvement is achieved with TM6, with a yet lower capacity loss of 45% between discharge capacities of 307 mAh/g and 170 mAh/g when cycled at 20 mA/g and 2000 mA/g, respectively, as seen in FIG. 4f.

Though the present invention is described with reference to particular embodiments, it will be understood to those skilled in the art that the foregoing disclosure addresses exemplary embodiments only; that the scope of the invention is not limited to the disclosed embodiments; and that the scope of the invention may encompass additional embodiments embracing various changes and modifications relative to the examples disclosed herein without departing from the scope of the invention as defined in the appended claims and equivalents thereto. For example, while the foregoing discussion speaks of the invention in the context of cathodes, it will be understood that compositions according to the present invention are not limited only to cathodes, and may encompass other structures for which the present high entropy design is applicable to provide the noted advantages.

While disclosed methods may be performed by performing all of the disclosed steps in the precise order disclosed, without any intermediate steps, those skilled in the art will appreciate that methods may also be performed: with further steps interposed between the disclosed steps; with the disclosed steps performed in an order other than the exact order disclosed; with one or more disclosed steps performed simultaneously; and with one or more disclosed steps omitted.

To the extent necessary to understand or complete the disclosure of the present invention, all publications, patents, and patent applications mentioned herein are expressly incorporated by reference herein to the same extent as though each were individually so incorporated (such incorporation being free of any licensing intentions for any common owned reference). Ranges expressed in the disclosure include the endpoints of each range, all values in between the endpoints, and all intermediate ranges subsumed by the endpoints. The terminology used herein is for the purpose of describing particular embodiments only and is not intended to be limiting of the disclosure. As used herein, the singular forms "a", "an" and the present invention is characterized by the appended claims.

CITED REFERENCES

[1] B. Kang, G. Ceder, *Nature* 458, 190-193 (2009).
[2] P. Barpanda, et al. *Nature materials* 10, 772-779 (2011).
[3] K. Kang, Y. S. Meng, J. Breger, C. P. Grey, G. Ceder, *Science* 311, 977-980 (2006).
[4] J. Lee, A. Urban, X. Li, D. Su, G. Hautier, G. Ceder, *Science* 343, 519-522 (2014).
[5] A. Urban, J. Lee, G. Ceder, *Advanced Energy Materials* 4, 1400478 (2014).
[6] Ji, H., Urban, A., Kitchaev, D. A., Kwon, D.-H., Artrith, N., Ophus, C., Huang, W., Cai, Z., Shi, baner T., Kim, J. C., et al. *Nature Communications* 10, 592. (2019).
[7] R. De Ridder, G. van Tendeloo and S. Amelinckx, *Acta Crystallogr, A* 32, 216-224. (1976).
[8] Banerjee, S., K. Urban, and M. Wilkens. *Acta Metallurgica* 32.3, 299-311 (1984).

What is claimed is:

1. A lithium metal oxide or oxyfluoride compound having a general formula: $Li_{1+x}TM[n]_{1-x}O_{2-y}F_y$, where TM[n] represents a number of transition metal species, inclusive of those differentiated by redox-active species or do redox-inactive charge compensators, wherein TM[n] is at least four of said transitional metal species, TM[1]a, TM[2]b, TM[3]c, and TM[4]d, comprising four or more TM species selected from the group of $Mn^{3+}$, $Ti^{4+}$, $Mn^{2+}$, $Nb^{5+}$, $Co^{2+}$, and $Cr^{3+}$, with $0.05 \leq x \leq 0.35$, $0.1 \leq a \leq 0.3$, $0.1 \leq b \leq 0.3$, $0.1 \leq c \leq 0.3$, $0.1 \leq d \leq 0.3$, and $0 \leq y \leq 0.5$, and wherein said lithium metal oxide or oxyfluoride has a cation-disordered rocksalt (DRX) structure.

2. The compound of claim 1 where TM[n] comprises at least $Mn^{3+}$ and $Ti^{4+}$.

3. The compound of claim 1, wherein TM[n] comprises at least six transitional metal species.

4. The compound of claim 3, wherein TM[n] comprises from six to ten transitional metal species.

5. The compound of claim 1, wherein the compound is $Li_{1.3}Mn^{2+}_{0.2}Mn^{3+}_{0.2}Ti_{0.1}Nb_{0.2}O_{1.7}F_{0.3}$.

6. The compound of claim 1, wherein the compound is $Li_{1.3}Mn^{2+}_{0.1}Co^{2+}_{0.1}Cr^{3+}_{0.1}Mn^{3+}_{0.1}Ti_{0.1}Nb_{0.2}O_{1.7}F_{0.3}$.

7. The compound of claim 1, which delivers a capacity of at least 307 mAh/g (955 Wh/kg) when cycled between 1.5 and 4.7 V at a rate of 20 mA/g when provided in a cathode.

8. The compound of claim 7, which retains a capacity of at least 170 mAh/g at a cycling rate of 2 A/g when provided in a cathode.

9. The compound of claim 1, wherein the compound has a cation ion order reflecting a mitigated short range order (SRO) characterized by the fact that, in TEM electron diffraction patterns, an SRO diffuse scattering pattern intensity is equal to or less than around 0.31 a.u. larger than a background intensity.

10. An electrode material, comprising:
a compound according to claim 1.

11. A lithium-ion battery, comprising:

an electrolyte; and the electrode material of claim 10.

12. The lithium-ion battery of claim 11, wherein the electrode material forms a cathode.

13. A portable electronic device, an automobile, or an energy storage system, comprising:

the lithium-ion battery of claim 12.

14. A method of making a lithium metal oxide or oxyfluoride compound having a general formula: LiTM[n] OF where TM[n] represents a number of transition metal species inclusive of transitional metal species differentiated by charge or $d^0$ electron shell conformation, comprising:

combining a collection of compounds composed of Li, TM[n], O, and optionally F, with Li present in excess, where TM[n] comprises at least four transitional metal species, TM[1]a, TM[2]b, TM[3]c, and TM[4]d, wherein TM[n] comprises four or more TM species selected from the group of $Mn^{3+}$, $Ti^{4+}$, $Mn^{2+}$, $Nb^{5+}$, $Co^{2+}$, and $Cr^{3+}$, with $0.1 \leq a \leq 0.3$, $0.1 \leq b \leq 0.3$, $0.1 \leq c \leq 0.3$, and $0.1 \leq d \leq 0.3$, to yield a precursor powder; and mixing the precursor powder to obtain a phase pure powder through mechanochemical alloying.

15. The method according to claim 14, wherein the precursor powder is subjected to mechanical mixing by dispensing the precursor powder into a planetary ball mill.

16. The method of claim 14, wherein TM[n] comprises $Mn^{3+}$ and $Ti^{4+}$.

17. The method of claim 14, wherein the compound is $Li_{1.3}Mn^{3+}{}_a Ti_b TM[3]_c TM[4]_d O_{1.7} F_{0.3}$.

18. The method of claim 14, wherein the compound is $Li_{1.3}Mn^{2+}{}_{0.2}Mn^{3+}{}_{0.2}Ti_{0.1}Nb_{0.2}O_{1.7}F_{0.3}$.

19. The method of claim 14, wherein, wherein the compound is $Li_{1.3}Mn^{2+}{}_{0.1}Co^{2+}{}_{0.1}Cr^{3+}{}_{0.1}Mn^{3+}{}_{0.1}Ti_{0.1}Nb_{0.2}O_{1.7}F_{0.3}$.

20. The method of claim 14, wherein the compound has the formula:

$$Li_{1+x}TM[1]_a TM[2]_b TM[3]_c TM[4]_{d=(1-x-a-b-c)}O_{2-y}F_y,\text{ wherein } 0.05 \leq x \leq 0.35 \text{ and } 0 \leq y \leq 0.5.$$

21. A lithium metal oxide or oxyfluoride compound having a general formula LiTMOF, wherein the compound has a cation-disordered rocksalt (DRX) structure, and TM includes at least four transitional metal species comprising at least $Mn^{3+}$ and $Ti^{4+}$.

22. The compound according to claim 21, further comprising at least two additional transitional metal species differentiated by charge or $d^0$ electron shell conformation and, selected from the group consisting of $Mn^{2+}$, $Co^{2+}$, $Cr^{3+}$, and Nb.

23. The compound of claim 21, wherein the compound has a cation ion order reflecting a mitigated short-range order (SRO) characterized by the fact that, in TEM electron diffraction patterns, an SRO diffuse scattering pattern intensity is equal to or less than around 1.07 a.u. larger than a background intensity.

24. The compound according to claim 1, wherein the compound exhibits a charging capacity based on an overall entropy corresponding to the number of transitional metal species TM[n] included therein, independent of any specific transitional metal species included therein.

\* \* \* \* \*